United States Patent [19]
Yamada

[11] Patent Number: 4,965,678
[45] Date of Patent: Oct. 23, 1990

[54] AREA DESIGNATION APPARATUS IN IMAGE PROCESSING SYSTEM

[75] Inventor: Masanori Yamada, Kawasaki, Japan

[73] Assignee: Canon Kabushiki Kaisha, Tokyo, Japan

[21] Appl. No.: 162,943

[22] Filed: Mar. 1, 1988

[30] Foreign Application Priority Data

Mar. 3, 1987 [JP] Japan ................................ 62-047952
Mar. 3, 1987 [JP] Japan ................................ 62-047953

[51] Int. Cl.⁵ .......................................... H04N 1/387
[52] U.S. Cl. ................................... 358/452; 358/453; 358/443; 382/48
[58] Field of Search .................. 358/256, 280; 382/48, 382/61

[56] References Cited

U.S. PATENT DOCUMENTS

| 4,667,248 | 5/1987 | Kanno | 358/280 |
| 4,679,095 | 7/1987 | Kitamura et al. | 358/282 |
| 4,683,500 | 7/1987 | Kitamura et al. | 358/280 |
| 4,733,304 | 3/1988 | Homma et al. | 358/280 |
| 4,760,463 | 7/1988 | Nonoyama et al. | 358/280 |
| 4,794,462 | 12/1988 | Kitamura et al. | 358/452 |

FOREIGN PATENT DOCUMENTS 0116568 5/1988 Japan .
0002473 1/1989 Japan .

OTHER PUBLICATIONS

Halftone graphic using program character set, R. K. Debry, IBM Technical Disclosure Bulletin, vol. 20, No. 6, Nov. 1977, pp. 2279–2281.

*Primary Examiner*—James J. Groody
*Assistant Examiner*—Kim Y. Vu
*Attorney, Agent, or Firm*—Fitzpatrick, Cella, Harper & Scinto

[57] ABSTRACT

An area designation apparatus includes an input unit for inputting coordinates of an area for image processing and a controller for determining an area on the basis of the coordinates input by the input unit. The input unit has a first input method for inputting two diagonal points of a rectangular and/or square area, and a second input method for inputting coordinates of at least three corners of a polygonal area. The controller automatically determines that the input coordinates by the input unit are entered in accordance with the first or second input method.

40 Claims, 18 Drawing Sheets

FIG. 17

⟨LAST POINT PROCESSING TYPE TABLE⟩

| | | TYo < TYi | | | | TYo = TYi | | | | TYi < TYo | | | |
|---|---|---|---|---|---|---|---|---|---|---|---|---|---|
| | Di-1 / Do | 0 | 1 | 2 | 3 | 0 | 1 | 2 | 3 | 0 | 1 | 2 | 3 |
| TXo < TXi | 0 | 4 | 3 | 12 | 8 | 1 | 1 | 11' | 11 | 3 | 4 | 8' | 8 |
| | 1 | 4 | 3 | 8' | 8 | 1 | 1 | 11' | 11 | 3 | 4 | 12 | 8 |
| | 2 | 13 | 9 | 5 | 2 | 10 | 10 | 11' | 11' | 9 | 13 | 5 | 2 |
| | 3 | 9' | 9 | 5 | 2 | 10 | 10 | 11' | 11 | 9 | 9' | 5 | 2 |
| TXo = TXi | 0 | 11' | 11' | 10 | 10 | 11 | 11' | 11 | 11 | 11' | 11 | 10 | 10 |
| | 1 | 11' | 11 | 10 | 10 | 11' | 11 | 11 | 11 | 11' | 11' | 10 | 10 |
| | 2 | 11' | 11 | 1 | 1 | 11 | 11 | 11 | 11' | 11 | 11' | 11 | 11 |
| | 3 | 11' | 11 | 1 | 1 | 11 | 11 | 11' | 11 | 11 | 11' | 11 | 11 |
| TXi < TXo | 0 | 4 | 3 | 8 | 12 | 1 | 1 | 11 | 11' | 3 | 4 | 8 | 8' |
| | 1 | 4 | 3 | 8 | 8' | 1 | 1 | 11 | 11' | 3 | 4 | 8 | 12 |
| | 2 | 9' | 9 | 2 | 5 | 10 | 10 | 11 | 11' | 9 | 9' | 2 | 5 |
| | 3 | 13 | 9 | 2 | 5 | 10 | 10 | 11' | 11' | 9 | 13 | 2 | 5 |

AREA DESIGNATION APPARATUS IN IMAGE PROCESSING SYSTEM

BACKGROUND OF THE INVENTION

1. Field of the Invention

The present invention relates to an apparatus for designating an area for image processing.

2. Related Background Art

A conventional image processing system such as a copying machine has a trimming function for extracting an arbitrary area of an original and a function for designating two diagonal points ($P_1,P_2$) of a rectangular and/or square area (FIG. 2-1) by using a digitizer as an area designating means (the latter scheme is called an opposite angle scheme hereinafter) in order to realize a masking function or the like (U.S. Ser. No. 884,677).

When an area such as a combination of a square and/or a rectangular areas is to be designated according to this opposite angle scheme, the area is divided into the squares and/or rectangles and must be designated by two pairs of diagonal points ($P_3,P_4$) and ($P_5,P_6$). In this case, it is difficult for an operator to divide a complicated area into a plurality of rectangles and/or squares. In addition, it is also difficult to ideally designate the divided portions without gaps, thus degrading operability. In order to improve operability, a scheme is proposed to input points in an order of $P_7$, $P_8$, $P_9$, $P_{10}$, $P_{11}$, $P_{12}$, and $P_7$ so as to surround the area to be designated with numeric keys (FIG. 2-3) as described in U.S. Ser. No. 942,035. According to this scheme, an area having a complicated area can be easily designated (this scheme is called a corner scheme hereinafter). According to the corner scheme, however, five (i.e., $P_{13}$, $P_{14}$, $P_{15}$, $P_{16}$, and $P_{13}$) or four points must be designated for even a simple area (FIG. 2-4), as described in U.S. Ser. No. 756,338, thus degrading operability.

A scheme for inputting area coordinates with a ten-key pad as an area designating means described in U.S. Ser. No. 4,517,606 requires reading of coordinates by a scale or the like and a large number of key strokes. In order to solve this problem, a two-dimensional coordinate input apparatus such as a digitizer described in U.S. Ser. No. 884,677 is available.

In the two-dimensional coordinate input apparatus such as a digitizer, a desired area on the original can be directly designated, thus greatly improving operability. According to this apparatus, however, flexibility of area designation is often beyond the capability of hardware. For example, an area having a shape which cannot be trimmed due to hardware limitations is undesirably designated.

SUMMARY OF THE INVENTION

It is an object of the present invention to provide an improved area designation apparatus which eliminates the conventional drawbacks described above.

It is another object of the present invention to provide an area designation apparatus capable of designating a desired area with simple operations.

It is still another object of the present invention to provide an area designation apparatus capable of designating an area by different methods wherein a best one of the methods need not be preset by an operator.

It is still another object of the present invention to provide an area designation apparatus having a determination function.

It is still another object of the present invention to provide an area designation apparatus capable of limiting an input area designated by an operator using a two-dimensional coordinate apparatus such as a digitizer within the limit of the capacity of hardware.

The above and other objects, features, and advantages of the present invention will be apparent from the following detailed description and the appended claims in conjunction with the accompanying drawings.

BRIEF DESCRIPTION OF THE DRAWINGS

FIG. 1-2 is a perspective view of a copying machine which employs the present invention;

FIGS. 2-1 to 2-4 are views for explaining area designation schemes;

FIG. 3 is a block diagram showing an arrangement of the copying machine;

FIG. 4 is a block diagram showing an arrangement of a coordinate input apparatus;

FIGS. 15-1 to 15-3 are views showing input point rearranging layout;

FIG. 17 is a view showing a table of last point processing types;

FIGS. 19-1 to 19-3 are views showing editing examples.

DETAILED DESCRIPTION OF THE PREFERRED EMBODIMENT:

An embodiment of the present invention will be described with reference to the accompanying drawings.

Figure 1:
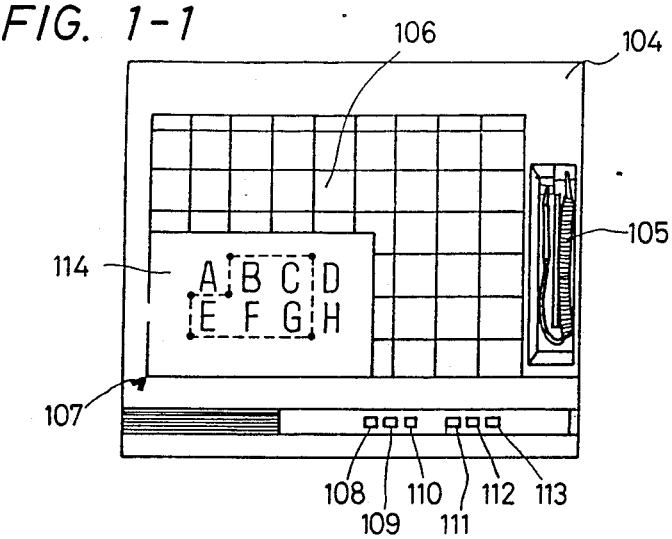
FIG. 1-1 is a schematic view showing an outer appearance of a coordinate input apparatus.
Figures 1, 2:
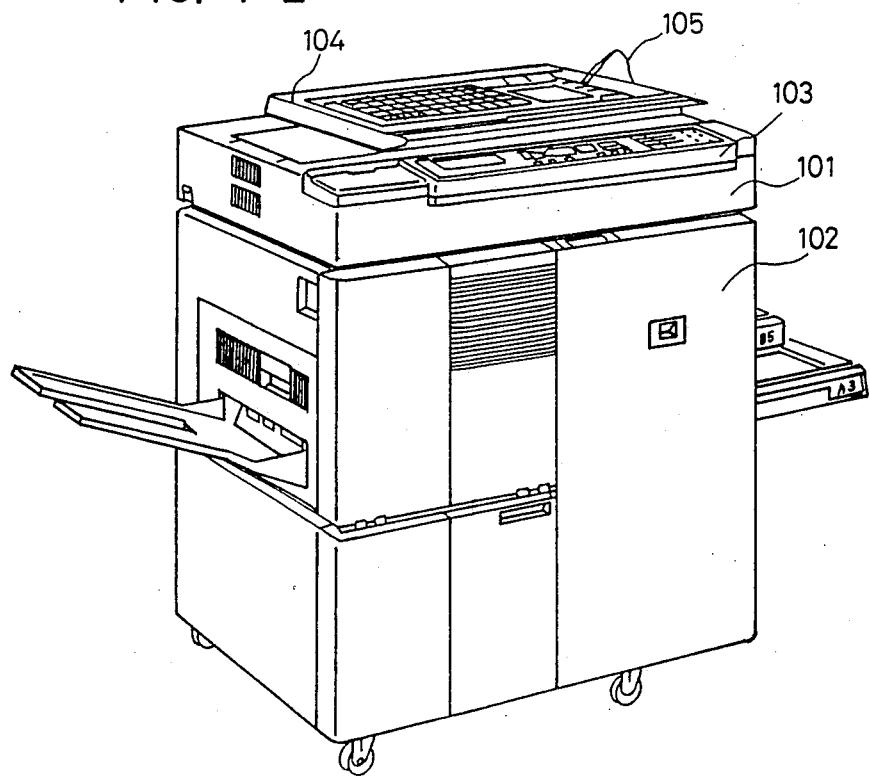

FIG. 1-2 shows an outer appearance of a copying machine which can employ the present invention. An original reader 101 includes an original glass table (not shown), an optical system comprised of an illumination lamp and mirrors, a lens, and a CCD. An original image is photoelectrically converted into an electrical signal while the original image is being scanned by the optical system in the subscanning direction. A printer 102 comprises a so-called laser printer. The printer 102 receives an electrical signal from the reader 101, scans the photosensitive body with a modulated laser beam, and prints out an image on a recording medium. The reader 101 comprises an operation unit 103, a coordinate input unit 104 which also serves as an original holder, and a coordinate input pen 105.

FIG. 1-1 is a plan view of the coordinate input unit 104. The coordinate input unit 104 includes an effective coordinate input surface 106, a reference point 107 used as a guide when an original 114 is placed on the input surface, an area designation key 108 for inputting an area designation command, a clear key 109 for cancelling a series of input coordinates, an OK key 110 representing that the area designation input is completed, a trimming mode selection key 111 for outputting only the designated area, a masking mode selection key 112 for erasing only the designated area, and an image separation mode selection key 113 for outputting an image portion inside the designated area in a processing mode different from an image portion outside the designated area.

Operations of the above components will be described below.

An operator places the original 114 such that it is brought into contact with the reference point 107. The operator then depresses the key 108 to set the area designation mode. The operator inputs black dots of an area surrounded by the dotted line clockwise or counterclockwise. When the input operation is completed, the operator depresses the OK key 110 to confirm the inputs. Thereafter, processing contents to be executed for the designated area are given with the keys 111, 112, and 113.

Figures 1, 2:
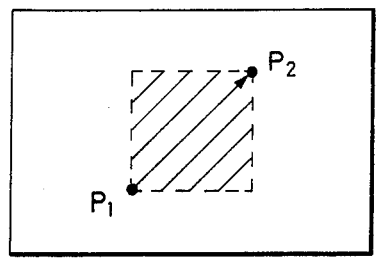
Figure 2:
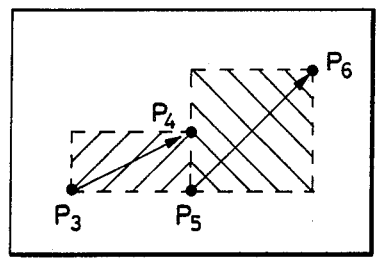
Figures 2, 3:
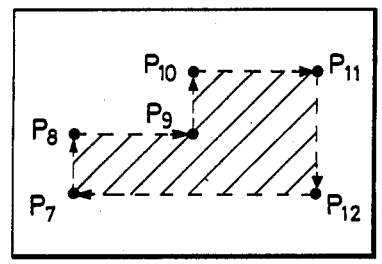

FIG. 3 is a schematic block diagram of a copying machine according to this embodiment of the present invention. The copying machine includes an image reader 302. The image reader 302 comprises a CCD, a signal amplifier, an A/D converter, and a shading correction circuit and inputs a corrected signal to an image processing unit 303.

In the image processing unit 303, an image signal is temporarily stored in an internal shift memory. The image processing unit 303 performs image processing such as variable magnification, move, trimming/masking, density conversion, and the like. The processing result as a video signal is output to an external unit 312. The external unit 312 comprises a so-called laser printer in this embodiment. However, a controller (e.g., an electronic file or a facsimile system) and a memory device may be used in place of the laser printer. The external unit communicates with the main unit by serial communication in accordance with a serial signal SRAL sent through a plurality of signal lines in a cable 313, in addition to the image signal VIDEO, and controls the entire operation of the copying machine. If the external unit 312 comprises a laser printer, a horizontal sync signal BD from the printer is supplied to the main unit, and a clock generator 304 generates clocks used for internal operations. These internal clocks are supplied to the reader 302 and the processing unit 303.

A CPU 301 comprises a ROM 305 for storing control programs and control data, a RAM 306 for storing processed data and the like, and a timer circuit 307 and controls communication with the reader 302, the processing unit 303, and the external unit 312. In addition, the CPU 301 controls a fluorescent lamp driver 309, a motor driver 308 for illuminating the original, an operation unit 311, and a coordinate input unit 310.

Figures 2, 3, 4:
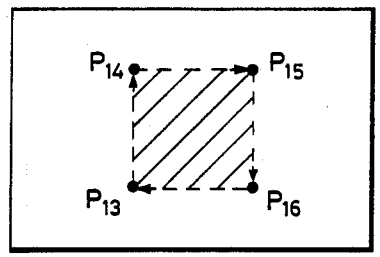
Figure 3:
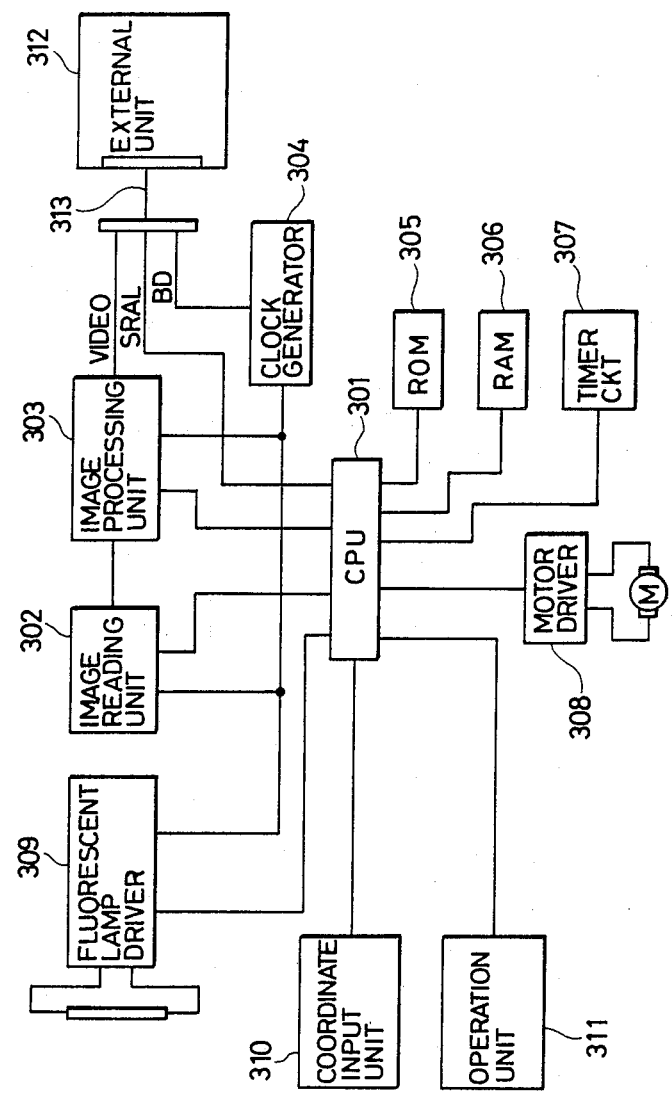
Figure 4:
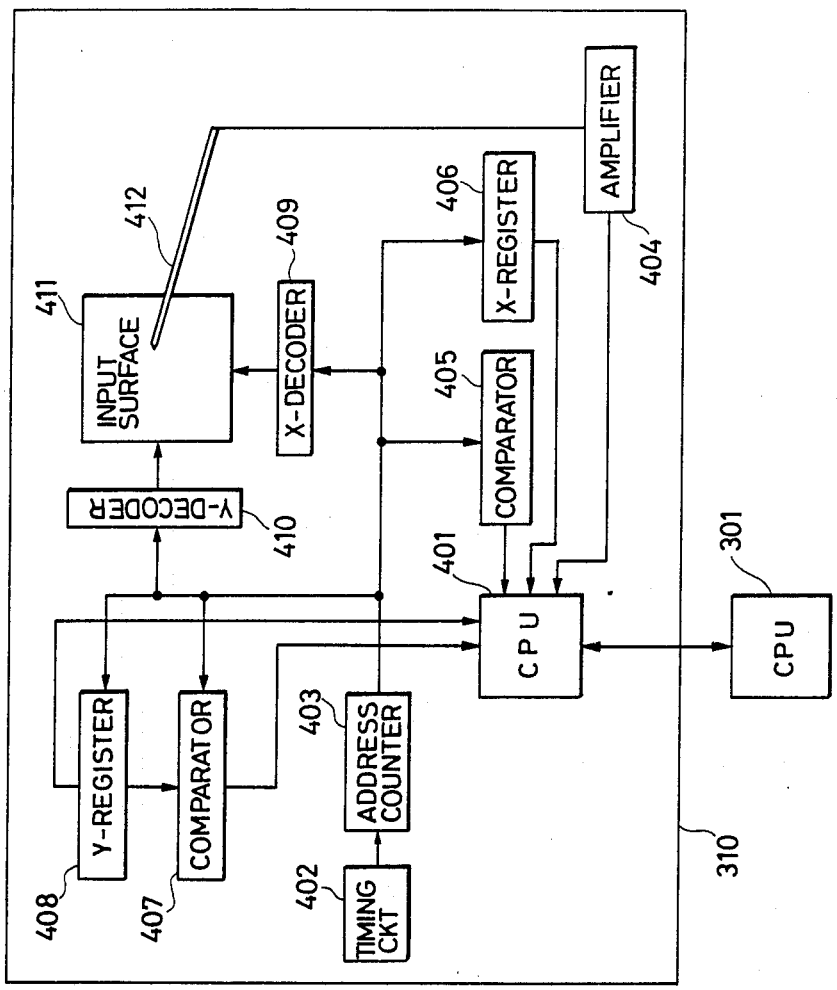

FIG. 4 is a block diagram of the coordinate input unit 310.

A timing circuit 402 causes its built-in oscillator to generate a clock and supplies it to an address counter 403. The address counter 403 performs counting during which a switch incorporated in a pen 412 is being depressed. During counting, an X-decoder 409 is operated to sequentially apply voltage pulses so as to dynamically scan X-direction electrodes of an input surface 411 twice. During counting, a Y-decoder 410 is then operated to sequentially apply voltage pulses to dynamically scan Y-direction electrodes of the input surface 411 twice. When the switch in the pen on the input surface 411 is turned on, a voltage is induced in the pen by capacitive coupling when X and Y scanning positions reach the pen position, thereby obtaining a pen input signal. The pen input signal is amplified by an amplifier 404. A count value of the address counter 403 is set in an X-register 406 in response to the first pen input signal in the X-direction scanning. The content of the X-register 406 is compared with a count value of the address counter 403 by a comparator 405 in response to the pen input signal in the second scanning cycle. If a coincidence is established in the comparator 405, a coincidence signal is output to a CPU 401. Similarly, a count value of the address counter 403 in the first scanning cycle in the Y direction is set in a Y-register 408 in response to the pen input signal. The count value of the address counter 403 is compared with the count of the Y-register 408 by a comparator 407 in the second scanning cycle in response to the pen input signal. If a coincidence is established in the comparator 407, a coincidence signal is output to the CPU 401. When two coincidence signals for the X and Y directions are obtained, the CPU 401 fetches coordinate values from the X- and Y-registers and signals the coincidence to the main CPU 301 by, e.g., serial communication. At the same time, an alarm tone is generated by a buzzer circuit (not shown) so as to signal to the operator that the coordinate inputs are effective. When the content of the X-register 406 does not coincide with the count value, the input is determined to be invalid. In this case, an alarm tone is not generated. This can be true for the Y direction.

Figure 5:
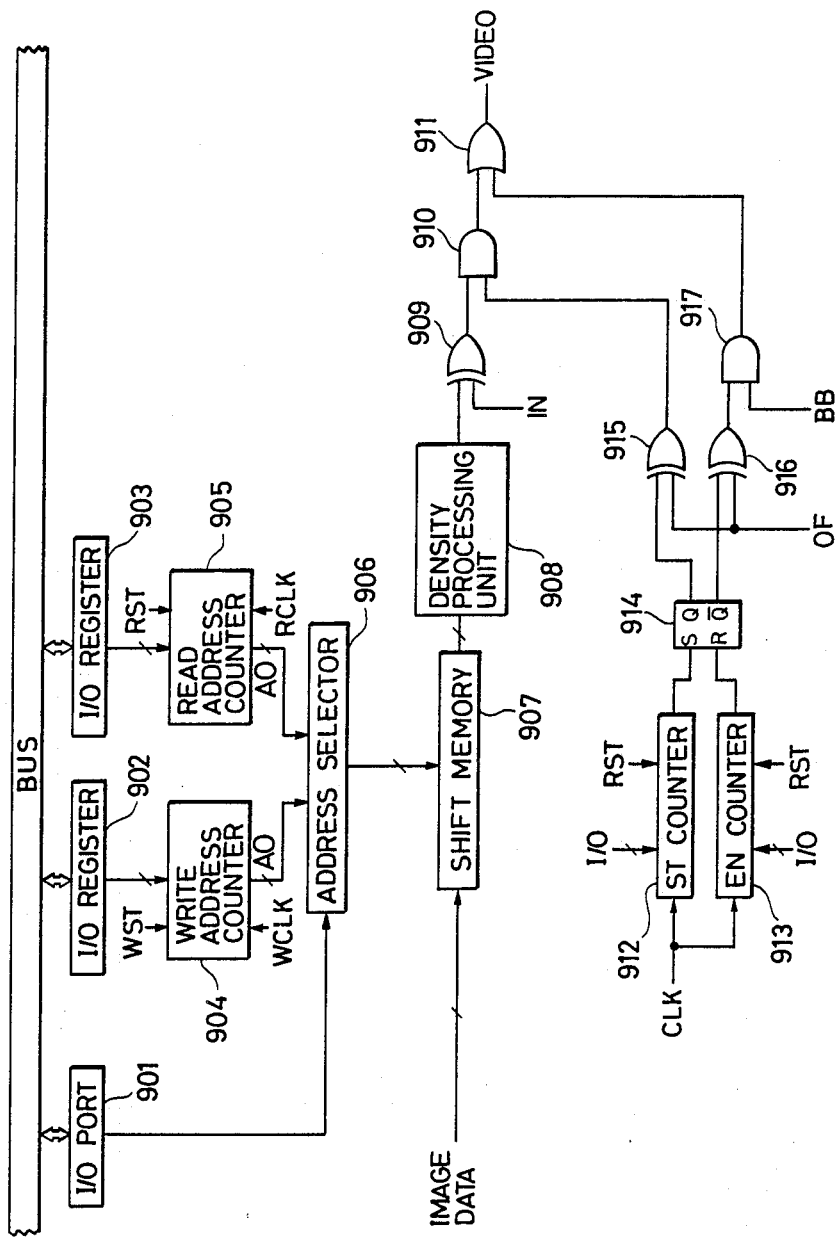
FIG. 5 is a block diagram of a circuit associated with editing.

FIG. 5 is a circuit diagram of an internal arrangement of the image processing unit 303 and, in particular, a circuit associated with the shift memory. Although the shift memory comprises two line shift memories, only one shift memory is illustrated in FIG. 5 since these memories are commonly controlled. In other words, FIG. 5 shows an arrangement of one of the two line shift memories. A write address counter 904 serves as an address counter for writing data in a shift memory 907. A read address counter 905 serves as an address counter for reading out data from the shift memory 907. An address selector 906 selects one of an address signal of the write address counter 904 and an address signal of the read address counter 905 to address the shift memory 907 in response to a command received from the CPU 301 through an I/O port 901.

I/O registers 902 and 903 are registers for causing the CPU 301 to supply preset values to the write and read address counters 904 and 905, respectively.

The write and read address counters 904 and 905 respectively comprise down counters for receiving the WST and RST signals for commanding the start of the down counters. The counters 904 and 905 also receive a write clock WCLK to the shift memory 907 and a read clock RCLK from the shift memory 907, respectively.

Exclusive OR gates 915 and 916 determine an image area and are controlled by a signal OF. When the signal OF is set at logic "1", the exclusive OR gates mask a frame determined by ST and EN counters 912 and 913 and an area outside the frame is defined as an output image. However, if the signal OF is set at logic "0", the area inside the frame is determined to be an output image, and therefore, the area outside the frame is masked.

An AND gate 910 controls an image data output as a binary signal output from the shift memory 907 through a density processing unit 908. An AND gate 917 determines whether the masked portion is output as a white or black portion. A signal BB controls the AND gate 917. When the signal BB is set at logic "1", the AND gate 917 determines the masked portion as a black portion. Otherwise, the AND gate 917 determines the masked portion as a white portion.

An OR gate 911 outputs image output from the gates 910 and 917 as a video output. An exclusive OR gate 909 controls black-and-white inversion of the image. A signal IN controls the exclusive OR gate 909. When the signal IN is set at logic "1", the exclusive OR gate 909 outputs the original image. However, if the signal IN is set at logic "0", the exclusive OR gate 909 inverts the image. Each signal is output by the CPU 301 in accordance with a mode designated by the operator.

The ST and EN counters 912 and 913 are start and end bit counters for outputting an image in a designated area. Gate count data is present from the CPU 301 to the start and end bit counters 912 and 913 through an I/O.

A flip-flop 914 is set by a count-up operation of the ST counter 912 and is reset by a count-up operation of the EN counter 913.

For example, if the signal OF is set at logic "1", the Q output from the F/F 914 is set at logic "1" in response to the count-up operation, an output from the gate 915 is set at zero. The output from the gate 910 does not appear until the count-up operation of the EN counter 913 is resumed. Meanwhile, since an output from the gate 916 is kept at logic "1", the gate 917 is set at logic "1" while the signal BB is set at logic "1". In this case, the gate 911 outputs a signal of logic "1" and masking in black is performed. To the contrary, if OF =1 and BB =0, then masking in white is performed. When the signal OF goes to logic "0", outputs from the gates 915 and 916 are set at logic "1" and logic "0", respectively. When the signal BB is set at logic "1", an area excluding the trimming area is set to be black. If the signal OF is set at logic "0", the area excluding the trimming area is set to be white.

This embodiment is very effective to perform editing such as trimming for a rectangular and/or square area and a combination of square and rectangular areas by using the above means.

The rectangular and/or square area and a combination of square and rectangular areas is an area surrounded by parallel and vertical line segments. It is effective to limit an editing objective to these areas. Without using a large-capacity memory, an editing function can be provided at low cost.

When coordinate inputs are entered by the coordinate input unit in accordance with the corner scheme in this embodiment, the operator inputs corners of the area constituted by a combination of rectangular and/or square areas so as to connect the corners in the horizontal and vertical directions as much as possible. When input operations are performed in accordance with the corner scheme, an end point is assumed to close to a start point.

Figure 6:
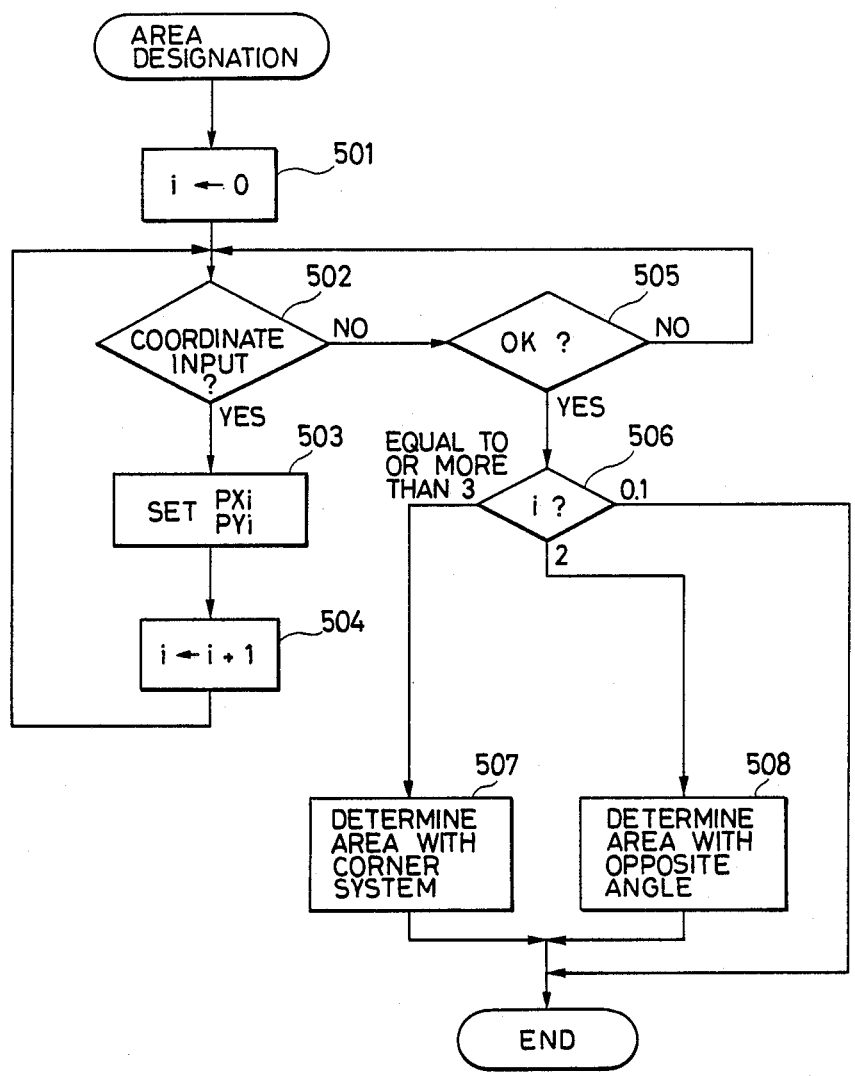
FIGS. 6 and 7 are control flow charts of area designation.
Figure 7:
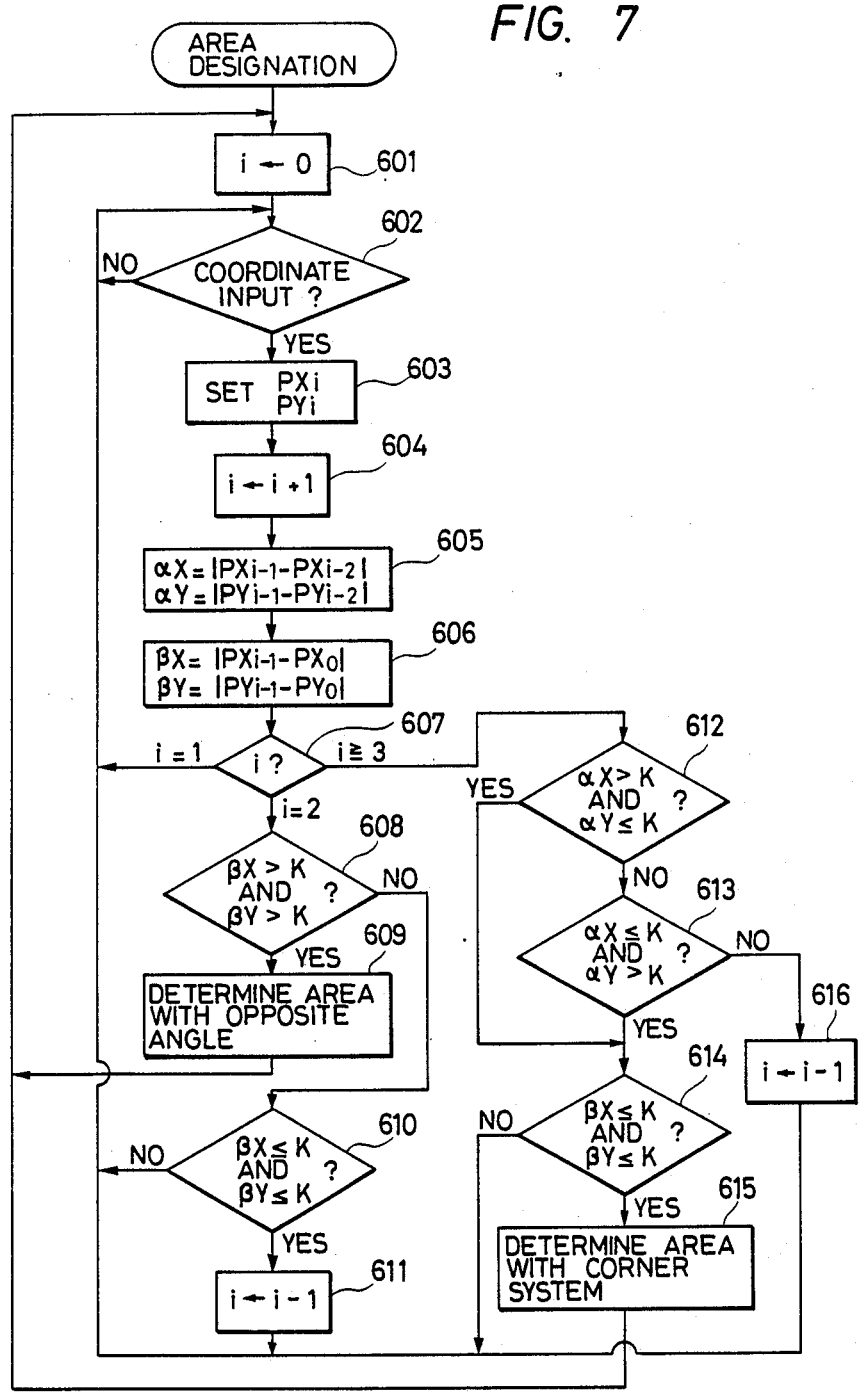

FIG. 6 shows a control flow of an area designation scheme according to this embodiment. A value "0" is preset in a counter i. If pen inputs are detected, X- and Y-coordinates are sequentially set in areas $(PX_0,PY_0)$, $(PX_1,PY_1), \ldots, (PX_i,PY_i)$ in the RAM 306 (501 to 504). If an OK key input is present (505), an input point count is checked by the counter i (506). If the number of points is 0 or 1, the area cannot be identified, and the CPU determines that no designation is made. If the number of input points is 2, the CPU determines that the input operation is performed in accordance with opposite angle scheme (508). However, if the number of input points is 3 or more, the CPU determines that the input operation is performed in accordance with the corner scheme (507). Since the number of input points is determined at the time of depression of the OK key, the operator need not select the input scheme beforehand. A scheme desired by the operator can be automatically determined in accordance with the number of coordinate points, thereby improving operability.

If the input area is a square area (FIG. 2-1) or a combination of square and rectangular areas (FIG. 203), the two input schemes can be used without contradiction, as shown in FIGS. 2-4 and 2-3.

FIG. 6 shows a control flow of another operation sequence. The input coordinate counter i in the RAM is cleared to zero (601), and the CPU waits for a coordinate input (602). If a coordinate input is detected, the X-coordinate is set in a flag $PX_i$ in the RAM and a Y-coordinate in a flag $PY_i$ (603). The counter i is incremented for the next input (604). Absolute values $\alpha X$ and $\alpha Y$ of differences between X- and Y-coordinates of the latest input point and the immediately preceding point are calculated (605). Absolute values $\alpha X$ and $\beta Y$ of differences between X- and Y-coordinates of the latest input point and the start point are calculated (606). If the number of input points is 1, the CPU waits for the second point input (607 and 602). If the number of input points is 2 (607), $\alpha X=\beta X$ and $\alpha Y=\beta Y$ are established. In addition, these values $\beta X$ and $\beta Y$ are larger than a reference value K (608), the first and second points are determined to be input in accordance with the opposite angle scheme. Processing is performed to determine the square area shown in FIG. 2-1 (609). When both the values $\beta X$ and $\beta Y$ are smaller than the standard value (610), the input of the second point is determined to be invalid, and the counter i is decremented so as to wait for an input again (611). If one of the values $\beta X$ and $\beta Y$ is smaller than K and the other is larger than K, the input points are input in accordance with the corner scheme. The CPU waits for the third point (601 and 602).

When the third or subsequent point is input (607), the relationship between the current input point and the immediately preceding point is checked. If the both the values $\alpha X$ and $\alpha Y$ are larger than K or smaller than K (612 and 613), the latest input is invalidated and the counter i is decremented so that an input is entered again (616 and 602). If one of the values $\alpha X$ and $\alpha Y$ is larger than the value K and the other is smaller than K, the inputs are determined to be valid in accordance with the corner input scheme. The positional relationship between the latest input point and the start point is checked. When both the values $\beta X$ and $\beta Y$ are smaller than K, the input point is determined to be a last point defining the area according to the corner scheme (614). Processing for determining the area is performed (615), and then the counter i is cleared to zero and the next area designation is awaited (601). When at least one of the values $\beta X$ and $\beta Y$ is larger than K, the input point is not detected as a last point and the CPU waits for the next coordinate input in accordance with the corner input scheme.

Figure 8:
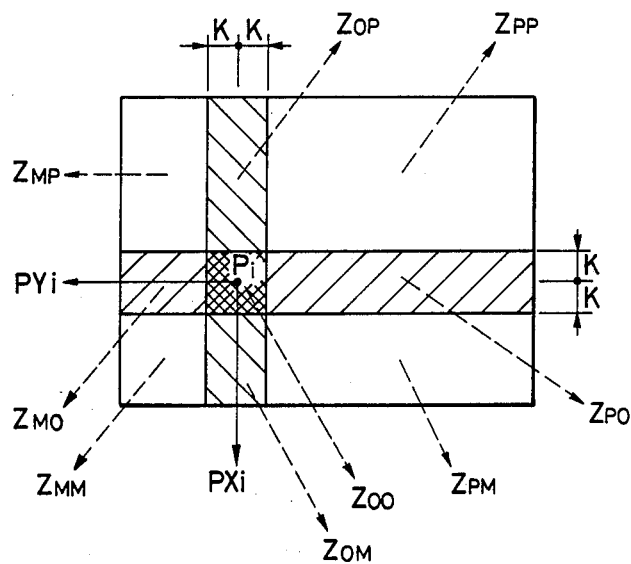
FIG. 8 is a view for explaining positional relationship of coordinates.

The principle of the above scheme is described with reference to FIG. 8. Two bands which intersect with each other at an input point $P_i$ in the X and Y directions are assumed, and an effective input surface of the coordinate input unit is divided into nine zones.

When the point $P_i$ is a start point and the second point belongs to any one of zones $Z_{PP}$, $Z_{PM}$, $Z_{MP}$, and $Z_{MM}$, the input points are determined as coordinate inputs according to the opposite corner scheme.

When the second point belongs to any one of zones $Z_{OP}$, $Z_{PO}$, $Z_{OM}$, and $Z_{MO}$, the input points are determined to be input in accordance with the corner scheme. The relationship between the point $P_i$ and the point $P_{i+1}$ indicates that the point $P_{i+1}$ must belong to any one of the four zones of the point $P_i$.

In order to finish coordinate inputs according to the corner scheme, if the point $P_i$ is the start point $P_0$, the last input point must belong to the zone $Z_{OO}$ of the point $P_0$. If the point $P_{i+1}$ next to the point $P_i$ is located in the zone $Z_{OO}$ of the point $P_i$, the point $P_{i+1}$ is determined to be invalid.

The reference value K used in the above description is a statistically or empirically determined coefficient representing variations in manual operations when two points are input possibly horizontally or vertically or the end point is input near the start point.

The above embodiment exemplifies a digital copying machine. However, the present invention can also be applied to an image input apparatus such as an analog copying machine, a facsimile apparatus, and an electronic file apparatus.

A capacitive-coupling digitizer is exemplified by the coordinate input apparatus. However, a digitizer of an electromagnetic induction type, an ultrasonic optical type, or a current shunt type using a resistor as well as an optical, magnetic or mechanical pointing device may be used.

The present invention may be applied to a coordinate input using numerical keys in place of the coordinate input with a digitizer.

As described above, when a rectangular and/or square area or a combination of square and/or rectangular areas is to be designated by the coordinate input unit, the input scheme is automatically determined to be the opposite angle scheme or the corner scheme in accordance with the number of input points entered from the operating means and representing the end of coordinate input, or in accordance with the positional relationship between the input coordinates. Therefore, an area designation system with excellent operability in consideration of the operator's will can be provided.

If the coordinate input is entered in accordance with the corner scheme, the operator inputs discrete coordinates so as to surround a desired area in such a manner that line segments obtained by connecting the coordinates are almost horizontal or vertical with respect to the main scanning/subscanning direction.

However, in practice, it is difficult to input two points connected horizontally or vertically by a free hand from the viewpoint of practical resolution of the coordinate input apparatus. Therefore, the input coordinates of the operator are corrected as follows.

Figure 9:
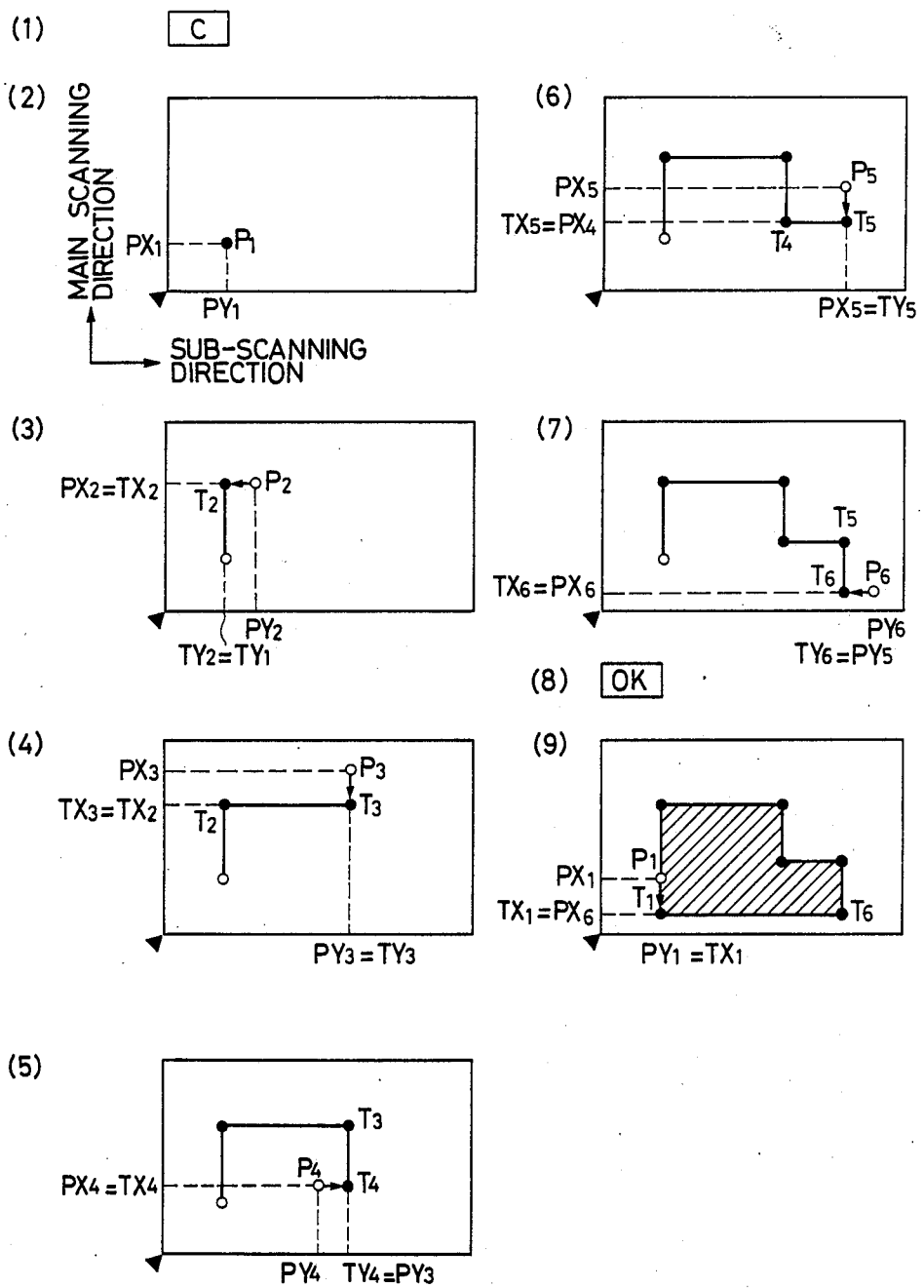
FIG. 9 is a view for explaining coordinate correction.

FIG. 9 shows an example of area designation according to this embodiment.

(1) Depress the clear key in order to clear all preset coordinates.

(2) Input the first point $P_1$ $(PX_1, PY_1)$.

(3) Input the second point $P_2$ $(PX_2, PY_2)$. In this case, the absolute values $|PX_2 - PX_1|$ and $|PY_2 \times PY_1|$ are compared. Since condition $|PX_2 - PX_1| > |PY_2 \times PY_1|$ is established, the point $P_2$ is corrected such that $T_2$ $(TX_2, TY_2) = (PX_2, PY_1)$.

(4) The third point $P_3(PX_3, PY_3)$ is input. In this case, since condition $|PX_3 \times TX_2| > |PY_3 \times TY_2|$ is established from the corrected second point $T_2$ and the third point $P_3$, the point $P_3$ is corrected such that $T_3$ $(TX_3, TY_3) = (PX_2, PY_3)$.

(5) The fourth point $P_4(PX_4, PY_4)$ is compared with the corrected third point $T_3$, and correction is performed such that $T_4$ $(TX_4, TY_4) = (PX_4, PY_3)$ Similarly, (6) The fifth point $P_5$ $(PX_5, PY_5)$ is corrected into $T_5$ $(TX_5, TY_5) = (PX_4, PY_5)$.

(7) The sixth point $P_6$ $(PX_6, PY_6)$ is corrected into $T_6$ $(TX_6, TY_6) = (PX_6, PY_5)$ (8) When corner inputs of a desired area are completed, depress OK key.

(9) When the OK key is depressed, the first point $P_1$ $(X_1, Y_1)$ is corrected into $T_1$ $(TX_1, TY_1) = (PX_6, PY_1)$ by end point processing (to be described laser) using the first point $P_1$ $(PX_1, PY_1)$ and the corrected last point $T_6$ $(TX_6, TY_6) = (PX_6, PY_5)$.

The input coordinates are corrected and controlled as described above, the desired area of the operator can be constituted by the vertical and horizontal line segments.

Figure 10:
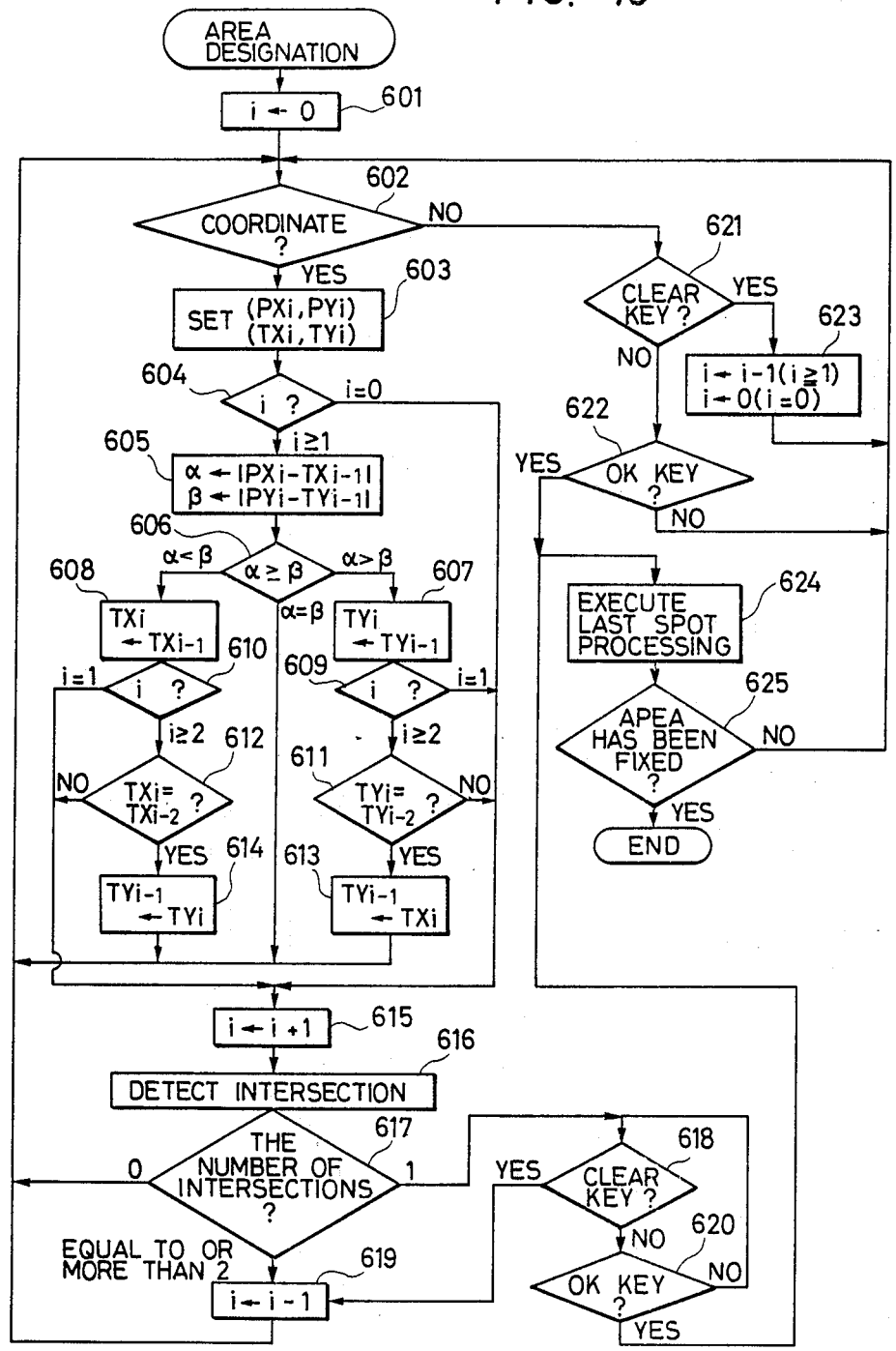
FIG. 10 is a control flow chart of an input coordinate correction.

FIG. 10 is a detailed flow chart for explaining correction processing described above. The input coordinate point counter i in the RAM is cleared to zero (601). If a coordinate input is detected (602), its X-coordinate is set in an area defined by $PX_i$ and $TX_i$ in the RAM and a Y-coordinate is set in an area defined by $PY_i$ and $TY_i$ (603). If i=0, i.e., the input point is the first point (604), the counter i is incremented so as to wait for the second point input (615). If i≈1 (604), then the absolute values $\alpha$ and $\beta$ of the differences of the X- and Y-coordinates of the corrected immediately preceding coordinates $(TX_{i-1}, TY_{i-1})$ and the current input coordinates $(PX_i, PY_i)$ (605). The absolute value $\alpha$ is compared with the absolute value $\beta$ (606). On the basis that the line segments connecting the respective points are input to be possibly parallel or perpendicular to the X- and Y-axes, if condition a $\alpha < \beta$, then the CPU determines that the operator inputs the coordinate input to be parallel to the Y-axis. The Y-coordinate $PY_i$ of the point $P_i$ of interest is employed as $TY_i$. The X-coordinate $PX_i$ is canceled. The immediately preceding X-coordinate $TX_{i-1}$ is employed as $TX_i$ (608). To the contrary, if condition $\alpha > \beta$, then the CPU determines that the operator inputs the coordinates so as to be parallel to the X-axis. In this case, the X-coordinate $PX_i$ of the point $P_1$ of interest is employed as $TX_i$. The Y-coordinate $PY_i$ is canceled and the immediately preceding Y-coordinate $TY_{i-1}$ is employed as $TY_i$ (607). By correction in steps 607 and 608, the input point $P_i$ is corrected as $T_i$. A line segment $\overline{T_{i-1}T_i}$ set to be parallel to the X- or Y-axis, and the resultant line segment $\overline{T_{i-1}T_i}$ checked whether to be set perpendicular to the immediately preceding line segment $\overline{T_{i-2}T_{i-1}}$. If i=1, then only one line segment is generated, and the counter i is incremented to wait for the third point input (609, 610, and 615). If i≧2, then whether $TX_{i-2} = TX_i$ is established, i.e., whether the two line segments $\overline{T_{i-1}T_i}$ of interest are located on one line segment parallel to the Y-axis is determined (612). Alternatively, whether condition $TY_{i-2} = TY_i$ is established, i.e., whether two line segments are located on one line segment parallel to the X-axis (611) is determined. If NO in steps 612 and 611, the counter i is incremented so as to wait for the next input (615). However, if YES in steps 612 and 611, these line segments are combined with each other. For this purpose, a sum vector of $\overrightarrow{T_{i-2}T_{i-1}} + \overrightarrow{T_{i-1}T_i} = \overrightarrow{T_{i-2}T_i}$ is rewritten into $\overrightarrow{T_{i-2}T_{i-1}}$ (613 and 614). More specifically, the immediately preceding input $T_{i-1}$ is canceled and $T_i$ is updated to $T_{i-1}$. The counter i is not incremented so as to wait for the $T_i$ input and the next coordinate input is waited for. After the counter i is incremented to wait for a new input (615), the number of intersections between the line segment $\overline{T_{i-2}T_{i-1}}$ generated by the latest input point $T_{i-1}$ between the all input segments $\overline{T_0T_1}, \overline{T_1T_2}, \ldots \overline{T_{i-3}T_{i-2}}$ is checked (616). A detailed flow will be described later.

No intersection is detected, the CPU waits for the next coordinate input (617 and 602). If the number of intersections is 2 or more, $T_{i-1}$ is detected to be invalid and the counter i is decremented by one so as to wait that the input is entered again (617 to 619). If the number of intersections is one, at least one closed area is generated. The CPU waits for the OK key input for ending area designation or a clear key input for canceling the point $T_{i-1}$. If a clear key input is detected, the counter i is decremented by one and the CPU waits that the input is entered again (618 and 19). If the OK key input is detected, last point processing to be described later is initialized (624).

If a coordinate input is not detected in step 602 and the clear key input is detected, the latest input point $T_{i-1}$ is canceled to decrement the counter i by one so as to wait that the input is entered again (623). If the OK key input is detected (624), last point processing to be described later is executed (624). When an area is determined in last point processing, the flow is ended. If not, the CPU waits for another coordinate input or another clear key input.

Figure 11:
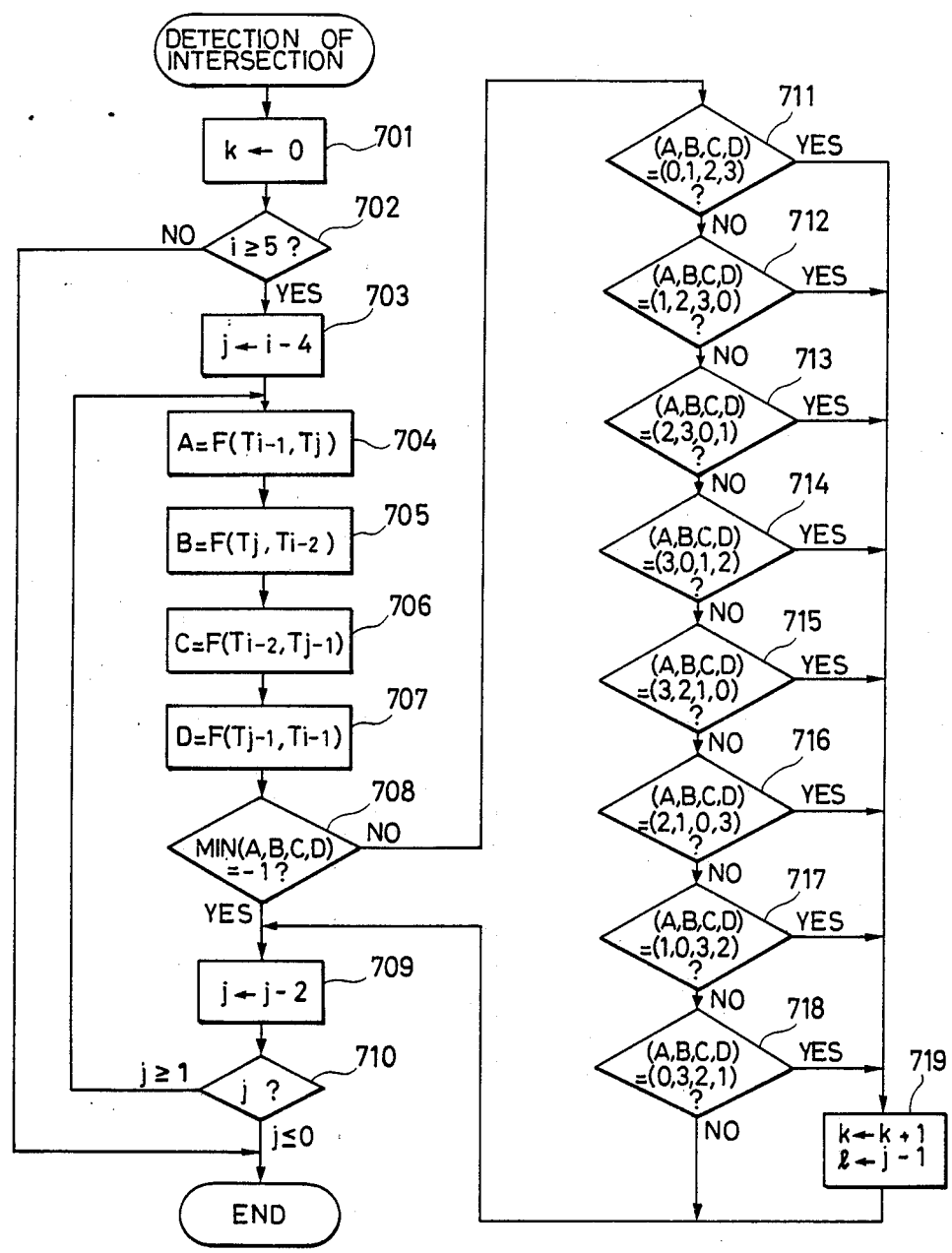
FIG. 11 is a control flow chart for intersection detection.

FIG. 11 shows a control flow of intersection detection. A counter k representing the number of intersections of the line segments is cleared to zero (701). If the value of the counter i representing the number of input points is given as i<4, only four points are input, i.e., only three line segments are input. In this case, detection processing is ended. If i≧5, i-4 is set in a counter j in the RAM to check the intersections (703). Thereafter, values A, B, C, and D are obtained by using coordinates of points $T_{i-1}$, $T_{i-2}$, $T_j$, and $T_{j-1}$ (704, 705, 706, and 707). The values are calculated by the following function F:

$$F(T_m, T_n) = \begin{cases} -1 & \text{for } TX_m = TX_n \text{ or } TY_m = TY_n \\ 0 & \text{for } TX_m < TX_n \text{ and } TY_m < TY_n \\ 1 & \text{for } TX_m < TX_n \text{ and } TY_m > TY_n \\ 2 & \text{for } TX_m > TX_n \text{ and } TY_m > TY_n \\ 3 & \text{for } TX_m > TX_n \text{ and } TY_m < TY_n \end{cases}$$

Figure 12:
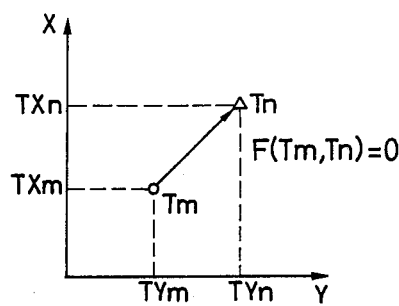
FIG. 12 is a view for explaining a function F used in intersection detection.
Figure 12:
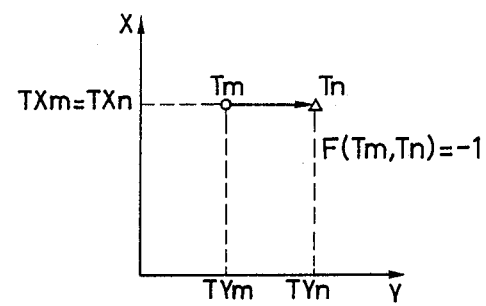
Figure 12:
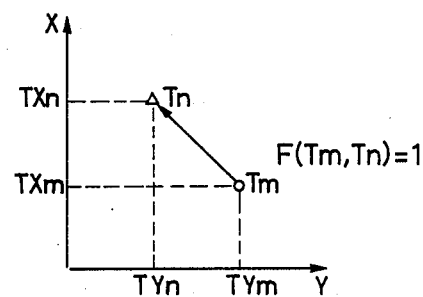
Figure 12:
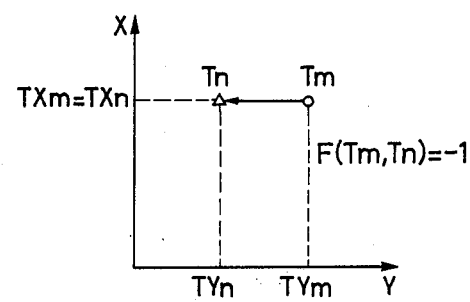
Figure 12:
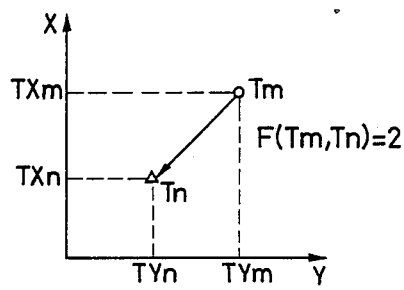
Figure 12:
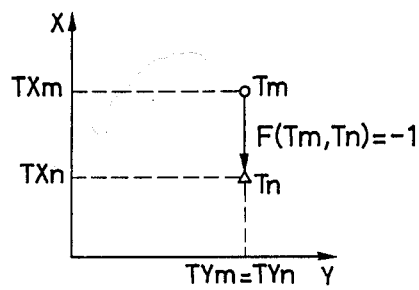
Figure 12:
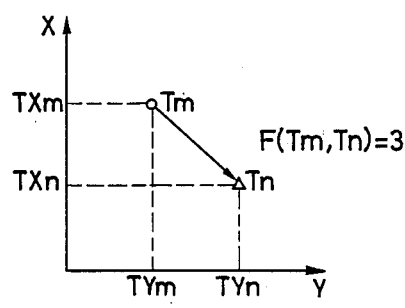
Figure 12:
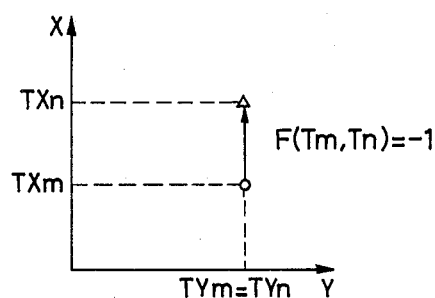

The function F is a function for assigning values when the relationship between the two points $T_m$ and $T_n$ is classified into five cases, as illustrated in FIG. 12. A vector $\overrightarrow{T_m,T_n}$ generated by the two points $T_m$ and $T_n$ is parallel to the X- or Y-axis, the value "-1" is output. When the vector $\overrightarrow{T_m,T_n}$ is inclined upward to the right, the value "0" is output. When the vector $\overrightarrow{T_m,T_n}$ is inclined upward to the left, the value "1" is output. When the vector $\overrightarrow{T_m,T_n}$ is inclined downward to left, the value "2" is output. When the vector $\overrightarrow{T_m,T_n}$ is inclined downward to the right, the value "3" is output.

Figure 13:
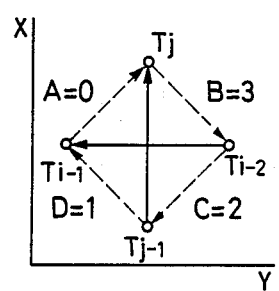
FIG. 13 is a view showing an intersection.

If the value "-1" is present in even one of the values A, B, C, and D, the line segments $\overline{T_{i-2}T_{i-1}}$ and $\overline{T_{j-1}T_j}$ can be brought into contact with each other but do not intersect each other. In other words, these line segments are parallel to each other, and j is updated (708 to 709). If the value "-1" is not detected, whether the values A, B, C, and D are consecutively incremented in an order of "0", "1", "2", and "3" or decremented in an order of "3", "2", "1", and "0" in steps 711 to 718 is determined. FIG. 13 shows a case in which YES is obtained in step 718.

When the points in FIG. 13 are rotated through every 90° clockwise, the positional relationship between the above four points causes YES in steps 715, 716, and 717. If the positional relationship between $T_j$ and $T_{j-1}$ is reversed in FIG. 13, YES is obtained in step 714. When the four points are sequentially rotated through every 90° counterclockwise, YES is obtained in steps 711, 712, and 713. If an intersection is detected in the above cases, the counter k for representing the number of intersections is incremented in step 719. A counter value j-1 for specifying the line segment $\overline{T_{j-1}T_j}$ which intersects the line segment $\overline{T_{i-2}T_{i-1}}$ is set in l. The value j is updated in step 709, and the check continues until condition j<0 is obtained in step 710.

The value j is decremented by two in step 709 because the line segment $\overline{T_{j-1}T_j}$ obtained by decrementing the value by one is parallel to the line segment $\overline{T_{i-2}T_{i-1}}$.

Figure 16:
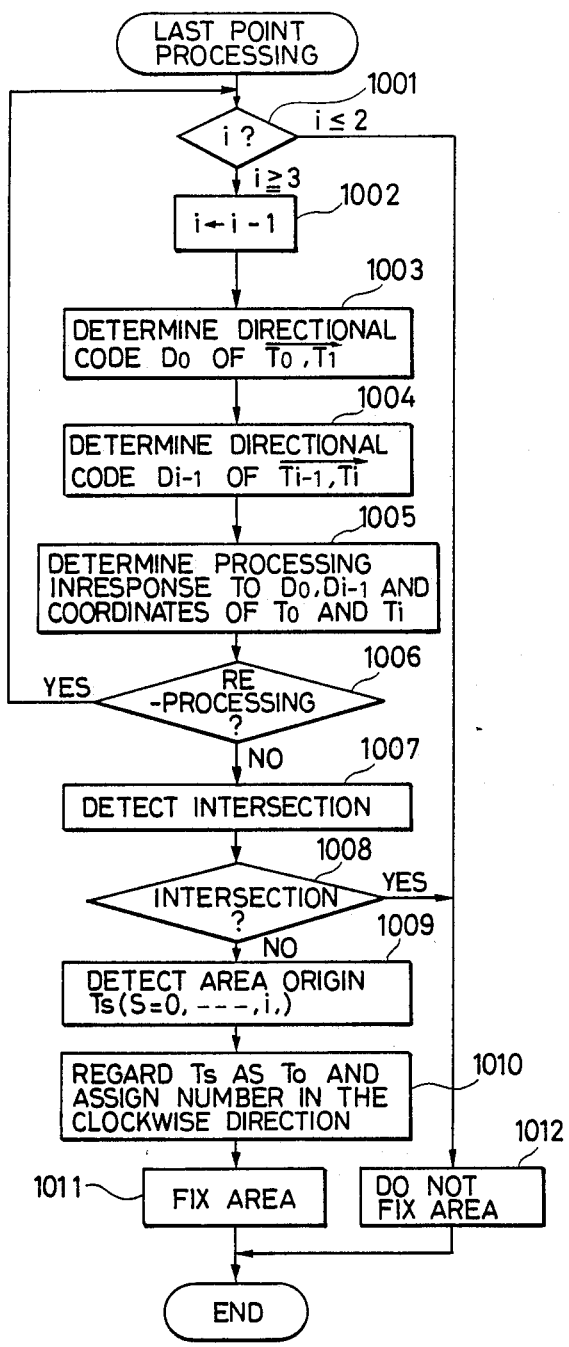
FIG. 16 is a control flow chart for processing a last point after coordinate input operations are completed.

FIG. 16 shows an end point processing flow.

The counter i is checked (1001). If condition i<2 is established, a maximum of two points are input. In this case, an area cannot be specified (1012), and the flow is ended so as to wait for an input again. If condition i≧3, then the counter i is decremented by one so as to obtain the latest input point number (1002).

Figure 14:
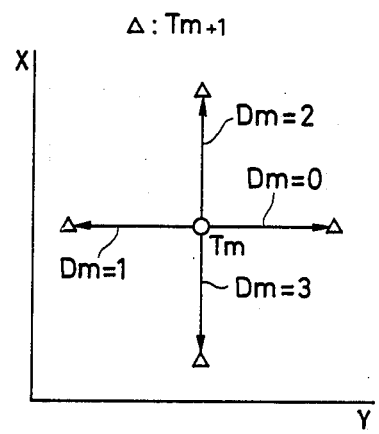
FIG. 14 is a view showing a directional code at an edge of an area.

A code $D_0$ representing the direction of the vector $\overrightarrow{T_0T_1}$ from the start point $T_0$ to the second point $T_1$ is determined in accordance with FIG. 14 (1003). A code $D_{i-1}$ representing the direction of the vector $\overrightarrow{T_{i-1}T_i}$ from the point $T_{i-1}$ directing toward the latest point $T_i$ is determined in the same manner as described above (1004). Thereafter, a last point processing type is selected in accordance with the two direction codes $D_0$ and $D_{i-1}$ and coordinates $TX_0$ and $TY_0$ of the start point $T_0$ and the coordinates $TX_i$ and $TY_i$ of the point $T_i$ and processing according to the contents of Table 1 is performed (1005).

TABLE 1

| Type | Processing Content |
| --- | --- |
| Type 1 | $S_p = T_0$ <br> $E_p = T_i$ <br> $i \leftarrow i$ |
| Type 2 | $S_p = T_0$ <br> $E_p = T_i \leftarrow (TX_0, TY_i)$ <br> $i \leftarrow i$ |
| Type 3 | $S_p = T_0$ <br> $E_p = T_i \leftarrow (TX_i, TY_0)$ <br> $i \leftarrow i$ |
| Type 4 | $S_p = T_0 \leftarrow (TX_0, TY_i)$ <br> $E_p = T_i$ <br> $i \leftarrow i$ |
| Type 5 | $S_p = T_0 \leftarrow (TX_i, TY_0)$ <br> $E_p = T_i$ <br> $i \leftarrow i$ |
| Type 6 | $S_p = T_0$ <br> $E_p = T_{i+1} \leftarrow (TX_0, TY_i)$ <br> $i \leftarrow i + 1$ |
| Type 7 | $S_p = T_0$ |

TABLE 1-continued

| Type | Processing Content |
|---|---|
|  | $E_p = T_{i+1} \leftarrow (TX_i, TY_0)$ |
|  | $i \leftarrow i + 1$ |
| Type 8 | $S_p = T_0 \leftarrow (TX_0, TY_i)$ |
|  | $E_p = T_{i-1}$ |
|  | $i \leftarrow i - 1$ |
| Type 8' | Reprocessing after type 8 |
| Type 9 | $S_p = T_0 \leftarrow (TX_i, TY_0)$ |
|  | $E_p = T_{i-1}$ |
|  | $i \leftarrow i - 1$ |
| Type 9' | Reprocessing after type 9 |
| Type 10 | $S_p = T_0 \leftarrow (TX_i, TY_i)$ |
|  | $E_p = T_{i-1}$ |
|  | $i \leftarrow i - 1$ |
| Type 11 | $S_p = T_0$ |
|  | $E_p = T_{i-1}$ |
|  | $i \leftarrow i - 1$ |
| Type 11' | Reprocessing after type 11 |
| Type 12 | For k = 0: processing type 7 |
|  | For k = 1: $S_p = T_0 \leftarrow (TX_i, TY_i)$ |
|  | $E_p = T_{i-1}$ |
|  | $i \leftarrow i - 1$ |
| Type 13 | For k = 0: processing type 6 |
|  | For k = 1: $S_P = T_0 \leftarrow (TX_i, TY_i)$ |
|  | $E_p = T_{i-1}$ |
|  | $i \leftarrow i - 1$ |

Note: $S_p$ is the start point and $E_p$ is the end or last point.

Figure 18:
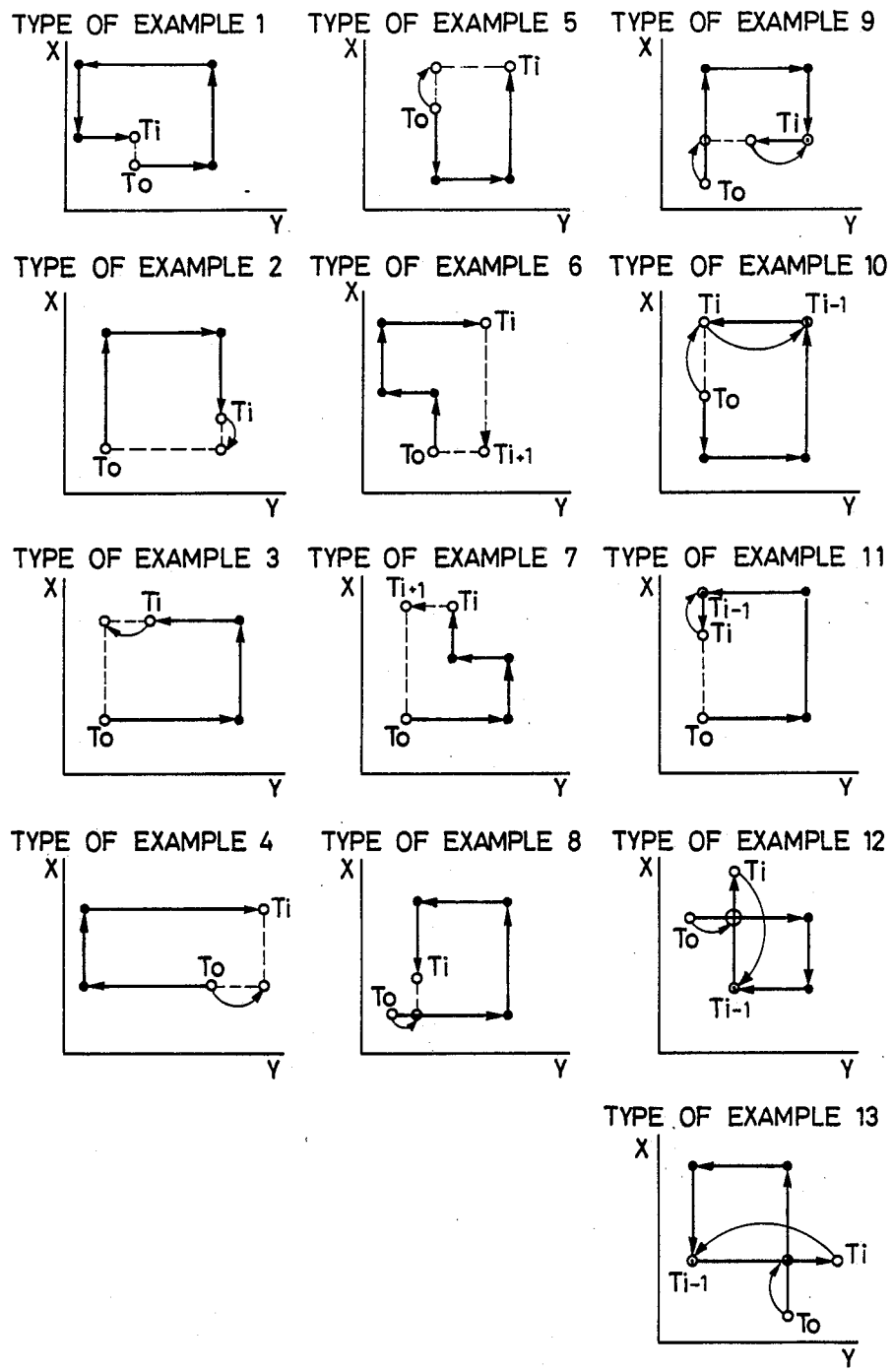
FIG. 18 is a view showing last point processing examples.

Correction examples according to the processing contents of the respective types described in Table 1 are shown in FIG. 18. Processing in Table 1 is performed to generate a line segment $\overline{T_iT_0}$ by using the start point ($S_p$) $T_0$ and the end point ($E_p$) $T_i$. When the line segment $\overline{T_0T_1}$ is perpendicular to the line $\overline{T_{i-1}T_i}$, reprocessing need not be performed. Otherwise, the operations from the step 1001 must be performed using the values $T_0$, $T_i$ and i (1006 to 1001).

After the coordinates of the respective corners of an area are designated by the above procedures, the intersections between the line segments obtained by connecting the points from $T_0$ to $T_i$ are checked in accordance with intersection detection logic described above (1007). If even one intersection is detected, the points are input again since the area is not clearly specified or the CPU waits for canceling of the input points (1008 to 1012).

$T_s$ of the minimum one of the X-coordinates corresponding to the minimum Y-coordinate of the points from point $T_0$ to the point $T_i$ is used as an area origin (1009). The area original $T_s$ is then defined as $T_0$. $T_1$, $T_2$, ..., $T_i$ are ordered clockwise from the new $T_0$ (1010), and the area is defined (1011), thereby ending the area designation operations.

Figures 1, 15:
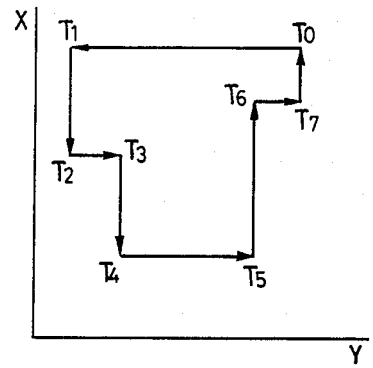
Figures 2, 15:
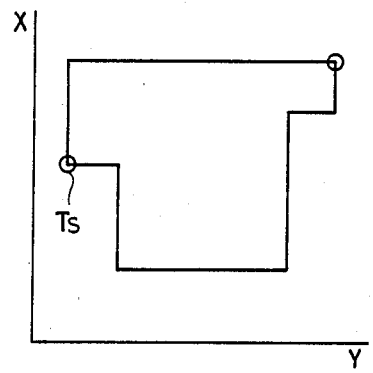
Figures 3, 15:
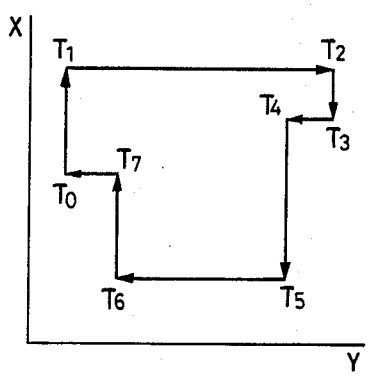

The processing examples in steps 1009 and 1010 are shown in FIGS. 15-1 to 15-3.

Editing of the area determined by the above procedures will be described with reference to FIGS. 19-1 to 19-3.

The points $T_0$, ... $T_i$ are projected on the X- and Y-axes as shown in FIG. 19-1 to obtain X-coordinates $KX_0$, $KX_1$, $KX_2$, $KX_3$ and Y-coordinates $KY_0$, $KY_1$, and $KY_3$. By using the above four points, the coordinate area is divided to define nine zones $Z_{00}$ to $Z_{22}$ shown in FIG. 19-1. As is apparent from FIG. 19-1, the desired area can be constituted by some of the nine zones. In order to distinguish the zones constituting the designation area, the zones are redefined by the coordinates of the center of gravity. More specifically, $Z_{ij}=(ZX_{ij}, ZY_{ij})$ (i=0, 1, 2; and j=0, 1, 2), $ZX_{ij}=(KX_i+KX_{i+1})/2$ and $ZY_{ij}=(KY_j+KY_{j+1})/2$. It is then determined whether the zones are included in the designated area in accordance with the following data $KX_0$ to $KX_3$, $KY_0$ to $KY_3$, and $Z_{00}$ to $Z_{22}$, as shown in FIG. 19-2.

A MAP in a matrix form is arranged in an area in the RAM. The odd-numbered rows and the odd-numbered columns of the MP correspond to boundary lines of the zones, and elements defined by the even-numbered rows and even-numbered columns correspond to the zones, respectively.

Direction codes 0, 1, 2, 3 are written in the corresponding ones of elements of the first column and the first row corresponding to $T_0$ in an order of $T_0$, $T_1$, ... $T_i$. All elements in the matrix representing each zone are checked whether code "0" is present in the upper direction, "1" in the lower direction, "2" in the left direction, and "3" in the right direction. If these four conditions are satisfied, the corresponding zone $Z_{ij}$ is included in the designation area. If one of the conditions is not satisfied, this zone is not included in the designation area. In the case of FIG. 19-2, a triangular mark represents the zone which is included in the designation area, and a cross mark represents the one which is not included in the designation area. In the above example, the MAP has a 7×7 matrix. However, in general, the map may have an N×M matrix and each element may have a maximum of 4 bits.

Figures 1, 19:
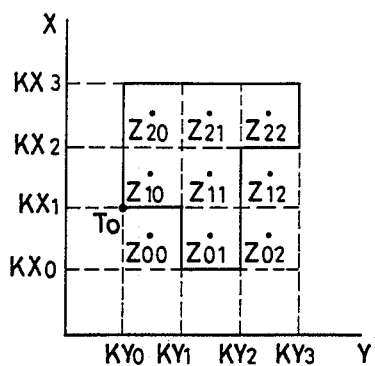
Figures 2, 19:
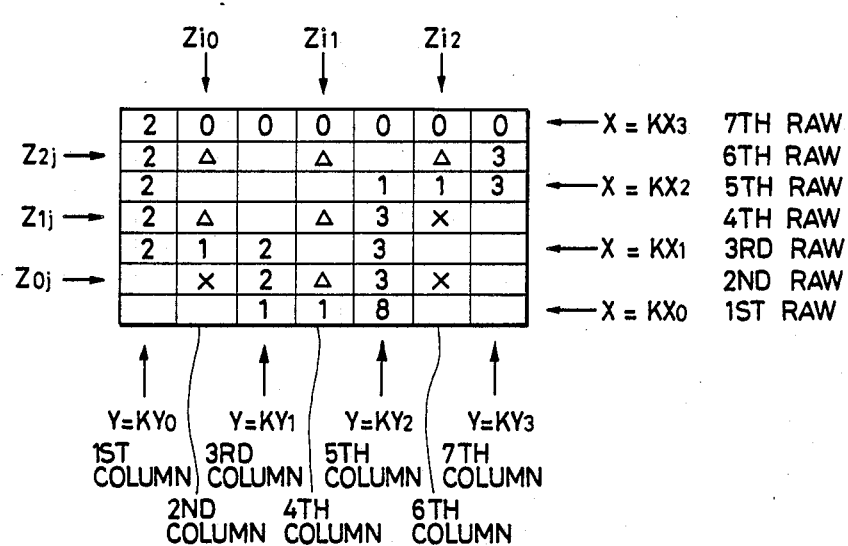
Figures 3, 19:
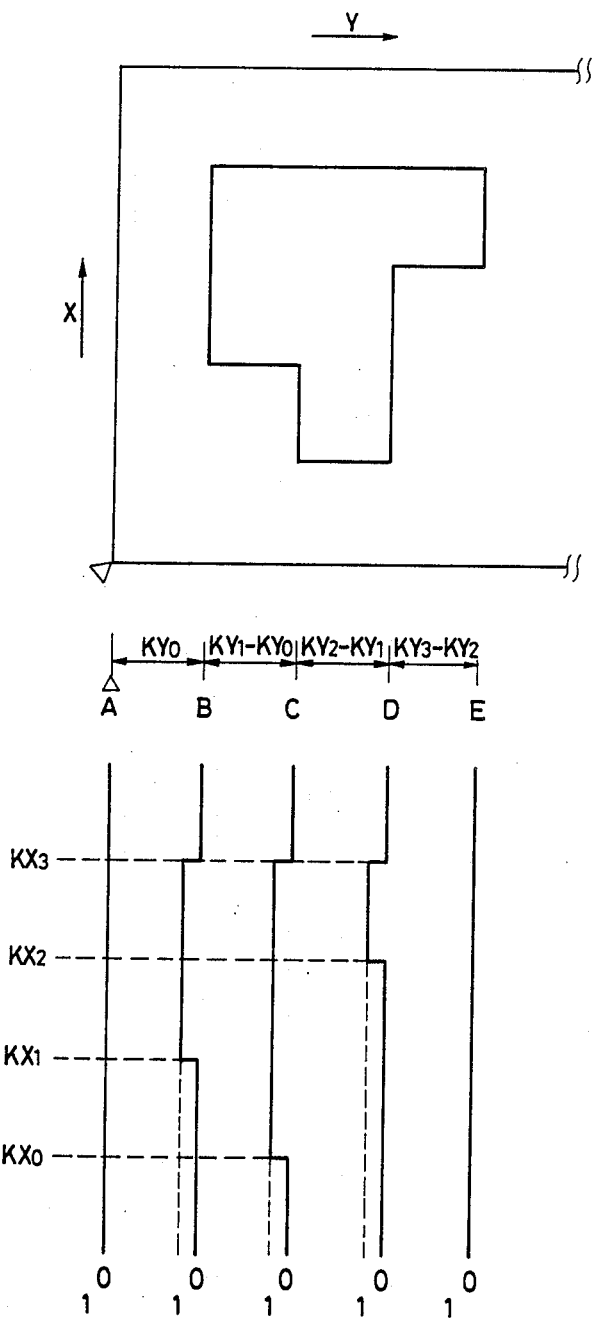

The zones $Z_{20}$, $Z_{10}$, $Z_{01}$, $Z_{11}$, $Z_{21}$, and $Z_{22}$ constituting the area are determined, editing is performed by the means (FIG. 5), as shown in FIG. 19-3.

When the optical system is moved in the subscanning direction Y, at a leading end A of the image, both the ST counter 912 and the EN counter 913 are set to be zero. $KX_1$ is set in the ST counter $KX_1$ and $KX_3$ is set in the EN counter at a point B advanced by $KY_0$ from the end A. $KX_0$ and $KX_3$ are set in the ST and EN counters, respectively, at a point C advanced by $KY_1-KY_0$ from the point B. $KX_2$ and $KX_3$ are set in the ST and EN counters, respectively, at a point D advanced by $KY_2-KY_1$ from the point C. $-KY_2$ and 0 are set in the ST and EN counters, respectively, at a point E advanced by $KY_3-KY_2$ from the point D. Thereafter, the optical system is moved reciprocally. The image portion inside the area becomes an effective or ineffective image, thereby performing masking of the image.

When the coordinates are corrected from the absolute values $\alpha$ and $\beta$ in step 606 in FIG. 10, a threshold value $\gamma$ is provided in addition to the absolute values $\alpha$ and $\beta$. In this case, if condition $\gamma > \min (\alpha \text{ and } \beta)$ is satisfied, correction is performed, thereby reflecting the will of the operator. In addition, assuming that condition $\alpha = \beta$ is established in step 606 in FIG. 10, that two or more intersections are detected in step 617, or that the area cannot be specified in step 625, a display or sound alarm representing that the input coordinate is invalid or that a coordinate input is requested is given to the operator, thereby further improving operability.

As described above, when the area is designated using the two-dimensional coordinate input apparatus, the input coordinates are sequentially corrected in accordance with the positional relationship with the previous input coordinates to estimate the operator's will. Without giving a promise for a specific input order or area definition, area designation falling within the range of the hardware processing capacity with excellent operability can be performed.

The present invention is not limited to the particular embodiment described above. Various changes and modifications may be made within the scope of the appended claims.

What is claimed is:

1. An area designation apparatus comprising:
   means for inputting coordinates of an area for image processing, said input means having a first input method for inputting two diagonal points of a rectangular and/or square area, and a second input method for inputting coordinates of at least three corners of a polygonal area; and
   control means for determining an area on the basis of the coordinates input by said input means, said control means automatically discriminating whether the input method of the input coordinates by said input means is the first input method or the second input method.

2. An apparatus according to claim 1, wherein said control means discriminates the input method in accordance with a number of input coordinate points input by said input means.

3. An apparatus according to claim 2, wherein said control means discriminates an input based on the first input method when the number of input coordinate points is 2 and an input based on the second input method when the number of input coordinate points is greater than 2.

4. An apparatus according to claim 2, further comprising means for designating an end of a coordinate input, wherein said control means discriminates the input method on the basis of the number of input coordinate points at the time when said designating means designates the end of the coordinate input.

5. An apparatus according to claim 1, wherein said control means discriminates the input method on the basis of input coordinate values of two points input successively by said input means.

6. An apparatus according to claim 5, wherein said control means discriminates an input based on the first input method when both a difference of X- coordinate values and a difference of Y-coordinate values of the input successively fall outside a predetermined range and an input based on the second method when only one of the differences falls within the predetermined range.

7. An apparatus according to claim 1, wherein said input means includes a digitizer for designating points of coordinates of the area.

8. An apparatus according to claim 1, further comprising means for trimming the area.

9. An apparatus according to claim 1, further comprising means for masking the area.

10. An apparatus according to claim 1, further comprising means for performing different image processing operations for areas inside and outside the area.

11. An apparatus according to claim 1, wherein the polygonal area includes an area as a combination of rectangular and/or square areas.

12. An apparatus according to claim 1, further comprising exposing means for exposing an original, wherein said input means inputs coordinates of an area within the original to be processed.

13. An apparatus according to claim 32, further comprising forming means for forming on a recording material an image of the original exposed by said exposing means.

14. An area designation apparatus comprising:
    means for inputting coordinates of an area for image processing;
    means for storing a plurality of coordinate values input by said input means;
    correcting means for replacing at least (1) a coordinate value currently being input by said input means or (2) a coordinate value previously input by said input means and stored in said storage means with another value in accordance with the coordinate value currently being input by said input means and other coordinate values stored in said storage means; and
    determining means for determining an area on the basis of the coordinate values replaced by said correcting means.

15. An apparatus according to claim 14, wherein said correcting means includes means for comparing input coordinate values of two points input successively by said input means and for correcting the input coordinate values in accordance with an output from said comparing means.

16. An apparatus according to claim 15, wherein said correcting means corrects the input coordinate values such that a line segment connecting the succeeding two points is parallel or perpendicular to a main scanning direction.

17. An apparatus according to claim 14, wherein said input means inputs coordinates of corners of a polygonal area.

18. An apparatus according to claim 17, wherein the polygonal area includes an area as a combination of rectangular and/or square areas.

19. An apparatus according to claim 14, wherein said input means includes a digitizer for designating points of coordinates of the area.

20. An apparatus according to claim 14, further comprising means for trimming the area.

21. An apparatus according to claim 14, further comprising means for masking the area.

22. An apparatus according to claim 14, further comprising means for performing different image processing operations for areas inside and outside the area.

23. An apparatus according to claim 20, further comprising exposing means for exposing an original, wherein said input means inputs coordinates of an area within the original to be processed.

24. An apparatus according to claim 23, further comprising forming means for forming on a recording material an image of the original to be processed.

25. An apparatus according to claim 12, wherein said correcting means corrects coordinates newly input by said inputting means, on the basis of the other coordinate values.

26. An apparatus according to claim 14, further comprising exposing means for exposing an original, wherein said input means inputs coordinates of an area within the original to be processed.

27. An apparatus according to claim 26, further comprising forming means for forming on a recording material an image of the original exposed by said exposing means.

28. An area designation apparatus comprising:
    means for inputting coordinates of an area for image processing;
    means for designating an end of an input of the coordinates of the area; and
    means for correcting start point coordinates or end point coordinates of the area which are input by said input means, wherein said correcting means corrects the start or end point coordinates on the basis of at least two data selected from the start point coordinates, the end point coordinates, a vector direction from the start point coordinates to input coordinates of a second point, and a vector direction from coordinates immediately preceding the end point coordinates to the end point coordinates.

29. An apparatus according to claim 28, wherein said input means inputs coordinates of corners of a polygonal area.

30. An apparatus according to claim 29, wherein the polygonal area includes an area as a combination of rectangular and/or square areas.

31. An area designation apparatus comprising:
means for inputting coordinates of an area for image processing, said input means having a first input method for inputting coordinates of an area having a predetermined shape, and a second input method for inputting coordinates of an area having an arbitrary shape; and
control means for determining the area on the basis of the coordinates input by said input means, wherein said control means automatically discriminates whether the input method of the coordinates input by said input means is the first input method or the second input method.

32. An apparatus according to claim 31, wherein said control means discriminates the input method in accordance with a number of input coordinate points input by said input means.

33. An apparatus according to claim 32, wherein said control means discriminates an input based on the first input method when the number of input coordinate points is 2 and an input based on the second input method when the number of input coordinate points is greater than 2.

34. An apparatus according to claim 31, wherein said control means discriminates the input method on the basis of input coordinate values of two points input successively by said input means.

35. An apparatus according to claim 34, wherein said control means discriminates an input based on the first input method when both a difference of X-coordinate values and a difference of Y-coordinate values of the two points input successively fall outside a predetermined range and an input based on the second method when only one of the differences falls within the predetermined range.

36. An apparatus according to claim 31, wherein said input means includes a digitizer for designating points of coordinate of the area.

37. An apparatus according to claim 24, further comprising exposing means for exposing an original, wherein said input means inputs coordinates of an area within the original to be processed.

38. An apparatus according to claim 36, further comprising forming means for forming on a recording material an image of the original exposed by said exposing means.

39. An area designation apparatus comprising:
means for inputting coordinates of an area for image processing, said input means having a first input scheme for inputting two diagonal points of a rectangular and/or square area, and a second input scheme for inputting coordinates of at least three corners of a polygonal area; and
control means for determining an area on the basis of the coordinate input by said input means, said control means automatically determining that the coordinates input by said input means are entered in accordance with the first or second input scheme, wherein said control means determines the input scheme on the basis of input coordinate values of two succeeding two points input by said input means, and wherein said control means determines an input based on the first input scheme when both differences between X- and Y-coordinate values of the succeeding two points fall outside a predetermined range and an input based on the second scheme when only one of the differences falls within the predetermined range.

40. An area designation apparatus comprising:
means for inputting coordinate of an area for image processing, said input means having a first input scheme for inputting coordinates of an area having a predetermined shape, and a second input scheme for inputting coordinates of an area having an arbitrary shape; and
control means for determining the area on the basis of the coordinates input by said input means, said control means automatically determining that the coordinates input by said input means are based on the first and second input scheme, wherein said control means determines the input scheme on the basis of input coordinate values of two succeeding two points input by said input means, and wherein said control means determines an input based on the first input scheme when both differences between X- and Y-coordinate values of the succeeding two points fall outside a predetermined range and an input based on the second scheme when only one of the differences falls within the predetermined range.

* * * * *

UNITED STATES PATENT AND TRADEMARK OFFICE
CERTIFICATE OF CORRECTION

PATENT NO. : 4,965,678

DATED : October 23, 1990

INVENTOR(S) : MASANORI YAMADA

It is certified that error appears in the above-identified patent and that said Letters Patent is hereby corrected as shown below:

SHEET 10 OF 18

FIG. 10, "APEA" should read --AREA--.

COLUMN 1

Line 19, "areas" should read --area--.
   Line 40, "Ser. No." should read --Pat. No.--.

COLUMN 2

Line 50, "EMBODIMENT:" should read --EMBODIMENT--.

COLUMN 5

Line 32, "an" should read --and--.
   Line 64, "to" (first occurrence) should read --to be--.

COLUMN 6

Line 21, "Figs. 2-4" should read --Figs. 2-2--.
   Line 31, "$\alpha X$" should read --$\beta X$--.
   Line 37, "these" should read --if these--.

COLUMN 7

Line 15, "$and\ the$" should read --and the--.
   Line 16, "$point\ P$" should read --point P--

COLUMN 8

Line 3, "$|PY_2X-$" should read --$|PY_2-$ --.
   Line 5, "$|PY_2XPY_1|$" should read --$|PY_2-PY_1|$--.

UNITED STATES PATENT AND TRADEMARK OFFICE
CERTIFICATE OF CORRECTION

PATENT NO. : 4,965,678

DATED : October 23, 1990

INVENTOR(S) : MASANORI YAMADA

It is certified that error appears in the above-identified patent and that said Letters Patent is hereby corrected as shown below:

COLUMN 8

Line 8, "$|PX_3 XTX_2| > |PY_3 XTY_2|$" should read -- $|PX_3 - TX_2| < |PY_3 - TY_2|$ --.
Line 23, "laser)" should read --later)--.
Line 37, "$i \cong 1$" should read --$i \geq 1$--.
Line 40, "and" should read --are--.
Line 45, "a" should be deleted.
Line 57, "set" should read --is set--.
Line 59, "checked" should read --is checked--.
Line 64, "of" should read --and $\overline{T_{i-2} T_{i-1}}$ of--.

COLUMN 9

Line 13, "the all" should read --all the--.
Line 20, "that" should read --until--.
Line 25, "that" should read --until--.
Line 32, "that" should read --until--.
Line 63, "A" should read --When a--.

COLUMN 12

Line 27, "The" should read --when the--.

COLUMN 13

Line 62, "claim 32," should read --claim 12,--.

COLUMN 14

Line 41, "claim 20," should read --claim 22,--.
Line 49, "claim 12," should read --claim 14,--.

UNITED STATES PATENT AND TRADEMARK OFFICE
CERTIFICATE OF CORRECTION

PATENT NO. : 4,965,678

DATED : October 23, 1990

INVENTOR(S) : MASANORI YAMADA

It is certified that error appears in the above-identified patent and that said Letters Patent is hereby corrected as shown below:

COLUMN 15

Line 53, "coordinate" should read --coordinates--.

COLUMN 16

Line 1, "claim 24," should read --claim 31,--.
   Line 5, "claim 36," should read --claim 37,--.

Line 32, "coordinate" should read --coordinates--.

Signed and Sealed this

Eleventh Day of May, 1993

Attest:

MICHAEL K. KIRK

Attesting Officer    Acting Commissioner of Patents and Trademarks